United States Patent [19]

Ehrich et al.

[11] 4,008,623
[45] Feb. 22, 1977

[54] GYROSCOPIC INSTRUMENT

[75] Inventors: Hans Ehrich, Kiel-Schulensee; Heiko Emshoff, Kiel-Holtenau; Hans-Peter Otto, Kiel-Projensdorf, all of Germany

[73] Assignee: Anschutz & Co. GmbH, Kiel-Wik, Germany

[22] Filed: June 3, 1975

[21] Appl. No.: 583,206

[30] Foreign Application Priority Data

June 5, 1974 Germany .................... 2427192

[52] U.S. Cl. .................. 74/5 R; 74/5.46; 33/327
[51] Int. Cl.² ........................ G01C 19/20
[58] Field of Search ........... 74/5.7, 5 R, 5.46, 5.5; 33/327 A, 364

[56] References Cited

UNITED STATES PATENTS

| | | | |
|---|---|---|---|
| 1,589,039 | 6/1926 | Anschutz-Kaempfe | 33/327 |
| 1,743,533 | 1/1930 | Davis | 33/327 |
| 2,734,280 | 2/1956 | Christoph | 33/327 |
| 3,373,617 | 3/1968 | Lassig | 74/5.46 |

*Primary Examiner*—Samuel Scott
*Assistant Examiner*—F. D. Shoemaker
*Attorney, Agent, or Firm*—Shlesinger, Arkwright, Garvey & Dinsmore

[57] ABSTRACT

A gyroscopic instrument which may be a compass includes a hollow sphere enclosing at least one motor-driven gyroscope and floating in an electrically conductive liquid within the inner surface of revolution of a vessel surrounding the sphere at a distance therefrom providing for a gap therebetween. A motor-driven pump circulates the liquid through an inlet of the vessel, through the gap, through an outlet of the vessel and through a passageway back to the pump. The surfaces confining the gap have pairs of opposite conductive electrode portions for conducting electrical energy to the motor-driven gyroscope or gyroscopes. The liquid circulating through the gap exerts a bearing pressure on the sphere holding it spaced from the inner surface of the vessel. For this purpose the gap has a relatively narrow bearing zone communicating with the inlet and a relatively wider zone communicating with the outlet. The width of the gap in the bearing zone is so differentially proportioned as to keep the velocity of the flow through the bearing zone substantially constant, such velocity being sufficiently low as to ensure laminar flow.

7 Claims, 7 Drawing Figures

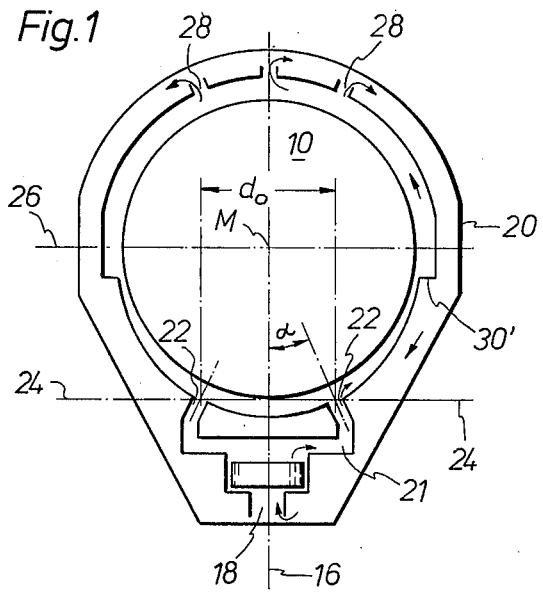
Fig. 1
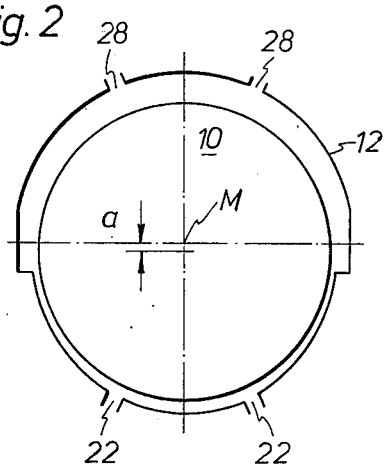
Fig. 2
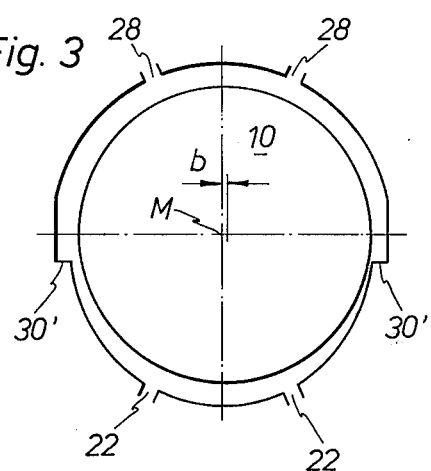
Fig. 3
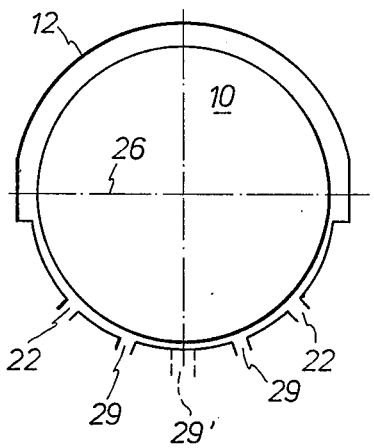
Fig. 4
Fig. 5

GYROSCOPIC INSTRUMENT

BACKGROUND AND BRIEF DESCRIPTION OF INVENTION

Our invention relates to a gyroscopic instrument, an more particularly to a compass, of the type in which a hollow sphere containing one or more electrically driven gyroscopes mounted therein is floating in an electrically conductive liquid within the inner surface of revolution of a vessel, this surface of revolution and the outer surface of the sphere being provided with opposed electrically conductive electrode portions for the purpose of conducting the electrical current driving the gyroscopes from the vessel through the liquid to the gyroscopic motors. The vessel is provided with an inlet and an outlet at different levels and a pump is provided for circulating the liquid from the pump to the inlet, through the gap between the inner surface of the vessel and the outer surface of the sphere, through the outlet and through a passageway back to the pump. The flow of liquid so produced exerts a bearing pressure on the sphere tending to hold the center thereof on a predetermined point of the axis of the inner surface of revolution of the vessel. A gyroscopic instrument of this type forms the subject matter of U.S. Pat. No. 3,373,617 granted to Martin Lassig on Mar. 19, 1968. In all of the embodiments of the prior invention covered by this patent, the internal surface of the vessel is a spherical surface and the bearing pressure exerted by the circulating liquid on the hollow sphere containing the gyroscopes tends to keep the hollow shere in concentrical condition within the inner spherical surface of the vessel. Displacement of the center of the hollow sphere from this concentrical location causes the restoring force to be produced by the bearing pressure on the hollow sphere and this restoring force can be increased by increasing the velocity of flow of the liquid through the gap between the hollow sphere and the inner wall of the vessel. It is desirable, however, to keep this velocity as low as possible to avoid turbulence because turbulence is liable to exert a torque about one or more axes on the hollow sphere. Such torque, however, would induce highly undesirable precessional motions of the gyroscopes detrimental to the accuracy of operation of the instrument.

Therefore, it is the primary object of our invention to increase the restoring force exerted by the circulating liquid on the hollow sphere counteracting displacement thereof from the intended position of its center on the vertical axis of the internal surface of revolution of the vessel without unduly increasing the velocity of flow of the liquid through the gap. It is a more particular object of our invention to so design the gyroscopic instrument of the type indicated hereinabove that displacement of the center of the hollow sphere from its intended position on the axis of the inner surface of revolution causes substantially the same restoring force to be produced by the bearing pressure exerted by the liquid on the floating sphere irrespective of the direction of such displacement. In other words, it is a more specific object of our invention to ensure that a horizontal displacement of the sphere produces a restoring force of substantially the same power as does a displacement in vertical direction.

It is another object of our invention to so design the gyroscopic instrument of the type indicated hereinabove that a circulation of minimum velocity of flow unable to produce torques on the sphere of seriously disturbing character will yet suffice to produce bearing pressures exerting a high restoring force on the sphere in event of a displacement of the center thereof in the vessel.

In all of the embodiments of the prior invention disclosed in said U.S. Pat. No. 3,373,617 the flow of liquid through the gap is symmetrical to the vertical axis of the vessel. Since the internal surface of the vessel confining the gap is a spherical surface, the width of the gap is invariable throughout its length, when the hollow sphere assumes its intended concentrical position. The cross-section of the flow is a zone of a conical surface having a comparatively small diameter near the inlet and a much larger diameter near the equator of the internal surface of the vessel. Therefore, the cross-section increases considerably from the inlet to the equator and, as a result, the velocity of flow decreases in proportion to the increase of the cross-section. As the maximum velocity near the inlet must not exceed a rather low limit to avoid turbulence, the flow closer to the exit will be extremely slow and, therefore, unable to contribute substantially to the bearing pressure.

We have now found that the bearing pressure can be substantially increased without increasing the flow velocity near the inlet by so changing the shape of the inner surface of revolution of the vessel as to substantially reduce the change of velocity of the flow from the inlet to the equator. More particularly we so shape the vessel as to create a relatively narrow bearing zone of the gap communicating with the inlet and a relatively wider zone communicating with the outlet, the bearing zone having an exit merging said bearing zone with the wider zone, the width $s$ of the bearing zone of the gap amounting at any point between the inlet and the exit to $$K \frac{d_o}{d} \cdot s_o$$

at the level of said inlet, $d_o$ being the outer horizontal diameter of said sphere at the level of said inlet, $d$ being the outer horizontal diameter of said sphere at said point, and $K$ being constant amounting to from 0.9 to 1.3, $s$ being a steady function of $d$ between said inlet and said exit, the feeding capacity of said pump being such that the flow of the liquid through said gap from said inlet to said outlet is laminar.

Owing to this profile of the inner surface of revolution of the vessel the liquid, in spite of the very low velocity of its flow, exerts on the hollow sphere an upwardly directed bearing force sufficient to carry the overweight of the floating sphere, such bearing force adapting itself automatically to any fluctuation of the overweight as may be caused by changes of temperature. When the overweight (the difference of the weight of the hollow sphere and of the elements mounted therein minus the weight of the liquid displaced by the hollow sphere) rises thus producing a tendency of the sphere to descend, the cross-section of the bearing zone of the gap tends to decrease and this leads to an increase of the bearing pressure exerted by the circulating liquid on the floating sphere whereby the tendency of the sphere to descend is counteracted. Similarly, any lateral displacement of the sphere will produce an increase of the bearing pressure laterally of the sphere whereby the lateral displacement is counteracted.

Owing to the improved shape of the internal surface of revolution of the vessel any disturbing torques exerted by the circulating liquid on the hollow sphere are reduced to the minimum permissible in a high quality gyroscopic instrument such as a compass. Irrespective of the low velocity of circulation of the liquid the floating sphere is effectively held within the vessel in its intended position even where displacing forces, such as acceleration, act on the floating sphere thus preventing any contact of the sphere with the vessel. More particularly, horizontal acceleration of the gyroscopic instrument will not produce excessive horizontal displacements of the floating sphere. Where the floating sphere has a weight of 8.5 kp, disturbing torques acting on the sphere are reduced by our invention to less than 0.01 cm .p. When applied to a compass, our invention will guarantee an accuracy of indication of the azimuth of $\pm 0.1°$. When our invention is applied to smaller gyroscopic instruments in which the weight of the floating sphere is lower, the permissible disturbing torques are smaller in the relation of 1:100.

In a preferred embodiment of our invention the width of the gap at any point of the bearing zone thereof amounts to 0.013 – 0.0075 of the diameter of the sphere but at least to 0.5 mm.

Preferably, our invention is applicable to the type of instrument illustrated in FIG. 3 of the U.S. Pat. No. 3,373,617 referred to hereinabove in which the gap between the floating sphere and the internal walls of the vessel has a relatively narrow bearing zone communicating with the inlet and a relatively wider zone communicating with the outlet.

Further object of our invention and the advance attained thereby will appear from the detailed description of various embodiments thereof described hereinafter with reference to the drawings. It is to be understood, however, that our invention is no way restricted to such embodiment but is capable of numerous modifications within the scope of the appended claims.

BRIEF DESCRIPTON OF DRAWINGS

FIG. 1 is a diagrammatic vertical section taken through a gyroscopic compass comprising a first embodiment of the invention, the floating hollow sphere being shown in elevation.

FIG. 2 shows said first embodiment of our invention with the floating sphere being downwardly displaced from its normal position by a distance $a$, FIG. 3 illustrates the first embodiment of our invention with the floating sphere being displaced from its normal position in horizontal direction by a distance $b$ under the effect of a lateral acceleration, FIG. 4 is a diagrammatic vertical section of a third embodiment of our instrument with the floating sphere shown in elevation and FIG. 5 is a diagram illustrating the pressure of the circulating liquid in the gap plotted against the path of the liquid from the inlet to the exit of the bearing zone.

Figure 6:
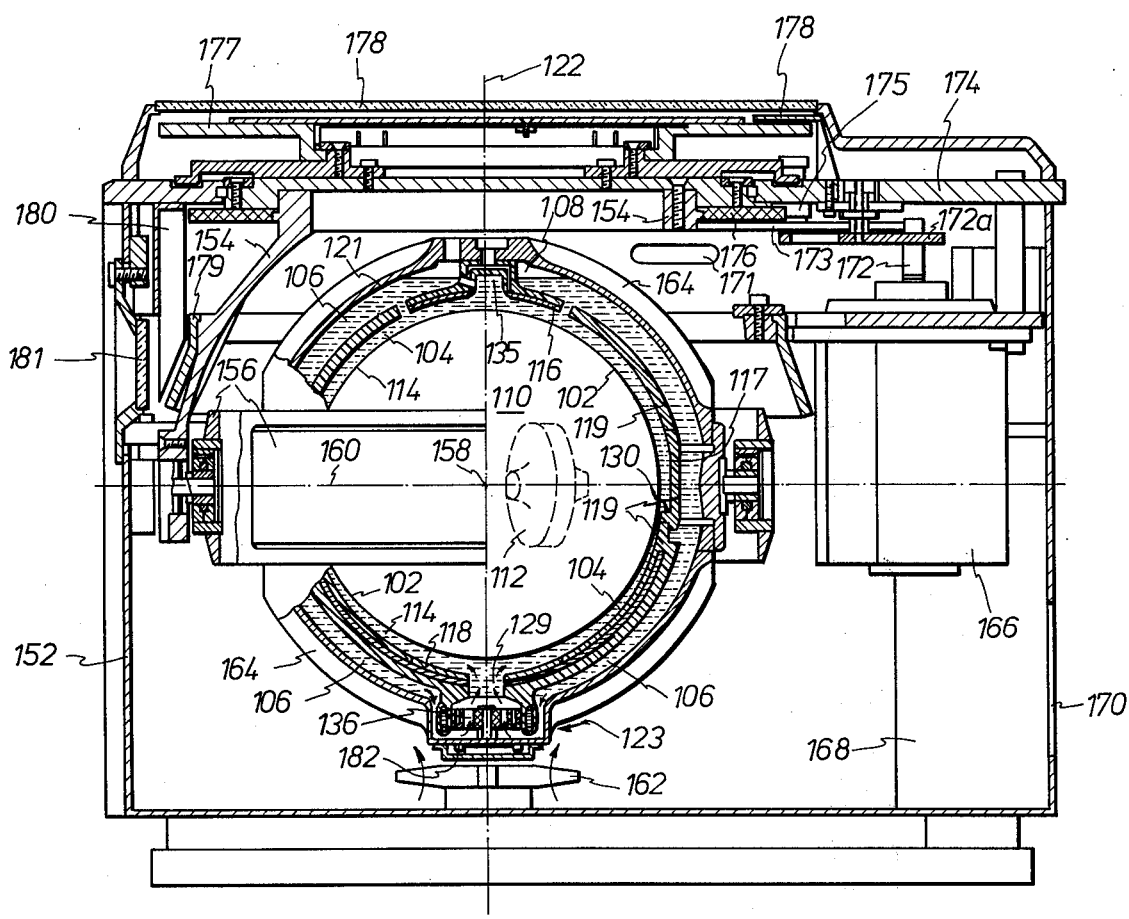

FIG. 6 is a vertical section taken through a gyroscopic compass similar to that shown in FIG. 13 of U.S. Pat. No. 3,373,617 referred to hereinabove but differing therefrom by the shape of the internal surface of revolution of the vessel enclosing the floating sphere.

Figure 1A:
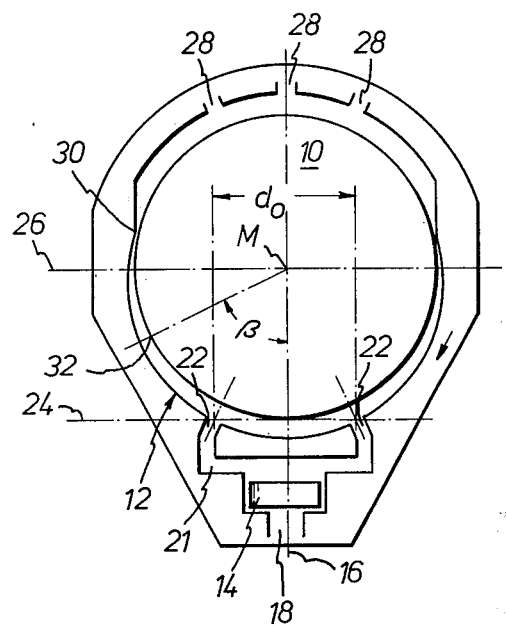
FIG. 1a is a diagrammatic vertical section taken through a somewhat modified gyroscopic compass comprising a second embodiment of the invention, the floating hollow sphere being shown in elevation.

The gyroscopic instrument diagrammatically illustrated in FIG. 1a has a hollow sphere 10 carrying one or more electrically driven gyroscopes mounted therein as is well known in the art. This hollow sphere floats in a liquid electrolyte filling a narrow gap between the hollow sphere 10 and the inner surface of revolution of a vessel 12. This vessel surrounds the hollow sphere either completely or at least in part as shown in FIGS. 3 and 4 of U.S. Pat. No. 3,373,617 referred to hereinabove. Below its bottom the vessel 12 is provided with a centrifugal pump, the rotor 14 of such pump rotating about the vertical axis 16 of the internal surface of revolution of the vessel. The pump is driven by an electric motor not shown. The rotor 14 of the pump sucks the liquid from below through an intake 18 communicating with the interior of a container 20 which surrounds the vessel 12 and the pump with a suitable distance therefrom. The discharge aperture of the pump located above the rotor 14 communicates by passageways 21 with ports 22 provided within the bottom of the vessel, a circular array of such ports or an annular slot being provided to form the inlet of the vessel, said array of ports or said slot being located within a horizontal plane 24 intersecting the axis 16 of the vessel closely above the bottom thereof.

The outer surface of the sphere 10 and the inner surface of the vessel consists of an electrical insulating material. However, both surfaces are provided with pairs of opposed electrically conductive electrode portions. One such pair is coextensive with the equator of the floating sphere. Another pair is provided at the top and a third pair at the bottom of the outer surface of the sphere and of the inner surface of the vessel. These pairs of electrode portions of the surfaces serve the purpose of supplying the gyroscope motors with the electrical current through the liquid electrolyte therebetween. This current serves the additional purpose of controlling a follow-up motor which drives the vessel 12 rotatably journalled in the container 20 about the vertical axis 16 in such a manner as to cause the vessel to follow the floating sphere whenever this sphere turns about its vertical axis.

The vessel 12 is provided with an outlet 28 located above the floating sphere 10. This outlet can be formed by a circular array of ports or by a circular slot. The outer surface of the container 20 is subjected to a cooling medium and, for this purpose may be provided with ribs.

The pump circulates the liquid electrolyte through the inlet 22, through the narrow gap confined between the floating sphere and the internal surface of the vessel, through the outlet 28 and back to the pump. The liquid flowing across the electrode portions of the surfaces confining the gap will be heated by the electric current and this heat will be dissipated by the container 20. The cooled liquid flows from the container 20 to the intake 18 for recirculation through the gap. The circulating liquid exerts a bearing pressure on the sphere so as to keep the center of the sphere on the axis 16 at a desired elevation.

The gap confined by the sphere 10 and the internal surface of revolution of the vessel 12 has a relatively narrow bearing zone communicating with the inlet 22 and a relatively wider zone communicating with the outlet 28, the bearing zone having an exit 30 or 30' (FIG. 1) merging the bearing zone with the wider zone.

This exit is located close to a horizontal plane 26 extending perpendicularly to the axis 16 of the internal surface of revolution of the vessel and through the center of the floating sphere, when this sphere assumes its normal position.

In the prior art the bearing zone of the gap has substantially the same width at all of its points, when the floating sphere is in its normal operative position. As a result, the cross-section of the flow of liquid through the gap is a minimum near the inlet, where the horizontal diameter of the floating sphere is small, and a maximum near the exit where the horizontal diameter of the floating sphere is a maximum.

As a result, the flow velocity is a maximum near the inlet and decreases considerably towards the exit of the bearing zone of the gap. Such a considerable change of the velocity of flow of the liquid, particularly such a considerable reduction of velocity towards the exit, leads to unstable conditions of flow resulting in torque-producing friction between the liquid and the sphere and to consequent interference with the proper operation of the gyroscopes.

Whereas in the prior art as disclosed in the US-Patent referred to hereinabove the width of the gap is the same at any point in the bearing zone thereof, when the instrument is in normal operation in which the center of the sphere assumes its intended normal position, we have given the internal surface of revolution of the vessel 12 such a profile that the width is wider near the inlet 22 and more narrow near the exit 30, or 30' respectively so as to suppress any substantial variation of the flow velocity of the liquid after entering the gap through inlet 22 and before leaving it at the exit 30 or 30' respectively. Therefore, the liquid can flow so slowly through the bearing zone of the gap as to render the flow laminar, i.e., substantially free of turbulence. In the second embodiment shown in FIG. 1a the radius of the internal surface of the vessel 12 extending thereto from the intersection M of axis 16 with plane 26 is a maximum at the bottom of the vessel near the inlet 22 and is a minimum in the horizontal plane 26 decreasing steadily from its maximum to its minimum. The radius is substantially the same for any point located above the plane 26 and below a horizontal circle 30 on the inner surface of the vessel. Above this circle 30 the radius may steadily increase to a maximum located above the sphere 10. The circle 30 represents the "exit" of the relatively narrow bearing zone of the gap.

In the first embodiment illustrated in FIG. 1 and in FIGS. 2, 3 and 4 the horizontal circle 30' constituting the exit of the narrow bearing zone is located a short distance below the horizontal plane 26. Whereas the width of the gap increases gradually above the exit 30 (FIG. 1a), it increases abruptly above the exit 30' in the first embodiment.

We have found that very satisfactory results are obtained with a width of the bearing zone of the gap at the bottom near the inlet of 0.013 of the diameter of the sphere and near the exit 30 or 30' of 0.0075 of the diameter of the floating sphere. The width decreases steadily between these limits. At any rate, however, the width of the gap at the exit 30 or 30' of the bearing zone must be in excess of 0.5 mm. These figures apply to the instrument in its normal operative condition in which the center of the floating sphere coincides with the intersection M of the horizontal plane 26 with the vertical axis 16 of the vessel 12.

While we prefer that under such normal conditions the velocity of the flow of the liquid electrolyte through the bearing zone of the gap be constant, it will suffice for practical purposes to avoid any substantial accelerations or decelerations of the liquid flowing through the bearing zone of the gap. More particularly, the width $s$ of this bearing zone of the gap can be calculated for any point between the inlet 22 and the exit 30 or 30' by the formula:

$$s = \frac{d_0}{d} \cdot s_0 \cdot K$$

$s_0$ being the width of the gap at the inlet 22, $d_0$ being the horizontal diameter of the floating sphere at the inlet 22 or, in other words, the diameter of the bottom cap of the sphere 10 located between the entrance ports constituting inlet 22, as indicated in FIG. 1, $d$ being the horizontal diameter of the floating sphere at said point and $K$ being a substantially constant figure amounting to from 0.9 to 1.3. Where K equals 1.0, the flow velocity is the same throughout the bearing zone of the gap with the sphere in its normal position. It is to be understood of course that the reference hereinabove to K being a constant should not be interpreted with mathematical accuracy. For all practical purposes this figure should be given an allowance of up to ± 10 percent. Where K differs from 1.0, the velocity of flow of the liquid from the inlet to the exit of the bearing zone will change somewhat, the change not exceeding the ratio 0.9:1.3. At any point of the bearing zone of the gap the cross-section of flow equals the product of the width $s$ at said point with the horizontal periphery of the floating sphere at said point.

Preferably the inner surface of the vessel 12 is so shaped as to be tangent to a spherical surface having the same diameter as the sphere 10, the line of tangency being a horizontal circle located within the bearing zone of the gap and below the center of the hollow sphere that is shown in FIG. 1a. In FIG. 1a the intersection of this horizontal circle with the plane of the drawing is indicated at 32. The radius from point 32 to the center of the sphere 10 includes an angle $\beta$ with axis 16. Preferably $\beta$ amounts to about 45°. In the drawings the sphere 10 is shown in floating condition being out of contact with the inner surface of the vessel 12. When the pump including the rotor 14 is stopped, however, the sphere will descend and finally settle in a resting position. In this resting position it would contact the inner surface of the vessel 12 at the bottom below the center M, if the inner surface of the vessel 12 were truly spherical having a somewhat larger radius than the sphere 10. What has been stated hereinabove, however, means that the inner surface of the vessel 12 below the exit 30 or 30' is not spherical but is so shaped that the sphere 10 in its resting position would contact the inner surface of vessel 12 at 32 still being out of contact with such inner surface below the circle 32 and above the circle 32.

The location of the circular array of ports or of the slot constituting the inlet 22 is determined by the size of the centri-angle $\alpha$ indicated in FIG. 1. $\alpha$ amounts to a value between 1° and 45° and preferably to about 25°. The circulation of liquid has the same direction as would be produced by thermal convection in the absence of the pump 14. Therefore, the thermal convection will assist the pump in sustaining the circulation.

The various parameters influencing the circulation such as the average flow velocity, the width of the gap, the dynamic viscosity etc. are so chosen that throughout the gap the flow of the liquid will remain laminar. This applies also to the regions where the flow cross-section changes.

Preferably the weight of the floating sphere and of the elements carried thereby is in excess of the weight of the liquid electrolyte displaced by the sphere, such excess being referred to hereinafter as "overweight". This overweight must be supported by the bearing pressures exerted by the circulating liquid on the sphere. Therefore, a higher pressure must be exerted on the sphere in the bearing zone of the gap than in the wider zone of the gap and the difference of these pressures must correspond to the overweight. For obtaining the required difference of pressures, a large pressure drop must occur between the inlet 22 and the exit 30 or 30' of the bearing zone. We have found that this pressure drop is substantially attained by the friction of the liquid electrolyte on the internal surface of the vessel 12 and the external surface of the floating sphere provided that the width of the bearing zone of the gap is sufficiently small. Pressure variations produced by dynamic forces rather than by friction are of minor importance for the bearing effect. The friction of a liquid flowing through a passageway depends on the size and shape of the cross-section of the passageway, on the flow velocity, on the viscosity of the liquid and on the length of the passageway and can be calculated by the following formula:

$$R = \frac{\eta \cdot F \cdot v}{h},$$

$\eta$ being the dynamic viscosity of the liquid, $F$ being the size of the cross-section of the passageway, $h$ being the width of the passageway and $v$ being the flow velocity.

Therefore, the friction exerted by the liquid electrolyte flowing through the bearing portion of the gap will increase with decreasing width of the gap.

The exit 30, or 30' respectively may be spaced from the horizontal central plane 26 a distance amounting to about 0.15 of the diameter of the floating sphere.

The pressure exerted on the bottom of the hollow sphere 10 by the liquid at any point of the gap of the sphere referred to hereinabove will be the same and will not vary in response to a departure of the floating sphere from its normal position. This pressure will be referred to hereinafter by P. The lower pressure prevailing in the gap between the exit 30 or 30' and the outlet 28 will be referred to hereinafter as the pressure $p$.

It is obvious that the differences between $p$ and P will increase in response to a descent of the hollow sphere from its normal position because such descent will throttle the circulating flow of liquid near circle 32. Inversely, the difference between P and $p$ will decrease in response to any ascent of the hollow sphere.

But not only a vertical displacement of the hollow sphere 10 from its normal position causes the liquid electrolyte circulating through the bearing zone of the gap to exert a restoring force on the hollow sphere 10. The same applies to a displacement of the center of the hollow sphere from the axis 16 in any horizontal direction as may be caused by a horizontal acceleration of the gyroscopic instrument. Why that is so, has not been fully understood as yet. It is believed however that the exertion on the sphere 10 of a horizontal restoring force in response to a horizontal displacement of the center of the sphere from its normal position can be explained by the following theory.

Such a horizontal displacement will widen the bearing zone of the gap on one side of the sphere and render the gap more narrow on the opposite side of the sphere. In FIG. 5 the specific pressure P of the liquid flowing through the bearing zone of the gap is plotted against the path of the liquid flowing from the inlet 22 to the exit 30, or 30' respectively, the ordinates indicating the pressure and the abscissae indicating the path of flow F. The inclined thin line indicates the pressure drop from the inlet 22 to the exit 30, or 30' respectively in event the floating sphere is properly centered with respect to the axis 16. In event of a lateral displacement the pressure in the gap widened on the one side of the sphere is indicated by the dotted line and the pressure prevailing on the opposite side where the width of the gap is reduced is represented by the curved full line. Consequently, the lateral displacement of the float produces a difference of specific pressures between one side of the sphere and the opposite side thereof. As the flow after entering the gap at 22 proceeds towards the exit 30 or 30' its pressure will first drop just as fast as it did prior to the lateral displacement of the sphere 10 as is indicated by the initial coincidence of the thin straight line and of the curved full line. Shortly, however, the pressure drop will decrease as is shown in the diagram of FIG. 5 by the fact that the curved full line is gaining a distance from the thin straight line. The maximum distance measured in vertical direction will be reached after the flow has proceeded through about two thirds of the distance of the exit 30 or 30' from the inlet 22. Thereafter the difference of the specific pressures under consideration decreases again until at the exit the pressures are equal.

Similarly the thin line indicates that at the opposite side of the sphere the pressure of the flowing liquid having entered the gap at 22 decreases sharply far below the level prevailing prior to the lateral displacement of the sphere. In fact, the surface in the diagram of FIG. 5 embraced by the curved full line and the curved dotted line is representative of the difference of the pressures prevailing in the flow after lateral displacement of the sphere 10 on opposite sides of the sphere. The average pressure is higher where the gap has been rendered more narrow and is lower where the gap has been widened. As the two areas where these modified pressures prevail have the same dimensions, the restoring force will result tending to center the floating sphere again with respect to the axis 16 of the vessel. We have found that this restoring force produced by a certain horizontal displacement of the center of the sphere is of about the same order as the restoring force produced by a similar displacement of the center in the vertical direction.

This restoring force prevents any collision of the floating sphere 10 with the surrounding vessel 12 even though the velocity of the circulating flow is low enough to prevent any turbulence or other disturbance tending to rotate the floating sphere 10 about any axis. Moreover it will appear from FIG. 5 that the restoring pressures are exerted on the sphere 10 within a range in which the horizontal component of the forces exerted by the pressurized liquid on the surface of the sphere is relatively high. In fact, it is about just as high as the restoring force exerted by the pressurized liquid in response to any vertical displacement of the sphere 10. This is of a great advantage because equality of the restoring force irrespective of the direction of the displacement of the center of the sphere 10 by a certain amount will avoid adverse effects caused by anisoelasticity. In other words, elastic deformation of the floating sphere 10 by the pressurized liquid will not depend on the direction of the displacement of the center of the sphere 10 with respect to the intersection of axis 16 with plane 26. Different elastic deformations might disturb the gyroscopic system.

Our invention is based on the fact that the liquid filling the bearing zone of the gap cannot be pressurized unless this flowing liquid must overcome a sufficient resistance in the gap. This resistance is obtained by rendering the gap in the bearing zone sufficiently narrow. The width s of this gap, however, should not be less than 0.5 mm. For various reasons this is the minimum width of the gap in the bearing zone that is practicable. Therefore, we have given the path of the flow from the inlet 22 to the exit 30, or 30' respectively, a relative high length on purpose. Making the path of the liquid relatively long avoids the necessity of making the gap extremely narrow for the purpose of ensuring the flow resistance required to pressurize the liquid.

The restoring force acting on the floating sphere in response to a displacement of its center within the vessel divided by the amount of such displacement is called the "rigidity" of the liquid bearing of the floating sphere. The horizontal rigidity is dependent upon the relation of the restoring force exerted by the liquid on the sphere to the overweight of the floating sphere. This relationship is indicative of the acceleration rigidity of the floating sphere. The overweight should be so chosen that under no circumstances will it be reduced to zero. Preferably the overweight amounts to 0.003 – 0.010 of the weight of the floating sphere. However, larger or smaller amounts of the overweight are applicable. For an instrument subjected to particularly high accelerations we may provide sensing means mounted on the vessel 12 and responsive to any relative displacement of the sphere 10. Controlling means, such as valve means, for varying the flow velocity of the liquid through the gap are provided and are acted upon by suitable actuating means which are adjustable by the sensing means. Such actuating means may comprise a solenoid cooperating with a spring and the adjusting means controlling the solenoid may be a suitable electrical circuit. In lieu of the valve for varying the flow velocity a suitable control circuit may be provided for varying the speed of operation of the pump 14. In other words, we provide our gyroscopic instrument with a sensor sensing the elevation of the floating sphere 10 relative to the vessel 12 and a controller by the sensor and regulating the elevation of the floating sphere within the vessel to a constant amount by variation of the flow velocity.

FIG. 2 illustrates the position of the floating sphere 10 after a downward displacement of its center by the amount $a$ below the horizontal plane 26. A comparison with FIG. 1 will show that the width of the bearing zone of the gap has been reduced. FIG. 3 illustrates a horizontal displacement of the sphere 10 towards the right by an amount $b$ under the effect of an accelerating force. FIG. 3 shows clearly that, as a result, the width of the gap has been reduced on the righthand side and increased on the lefthand side within the bearing zone.

FIG. 4 illustrates the application of the invention to the type of gyroscopic instrument shown in FIG. 5 of U.S. Pat. No. 3,373,617 and described with reference thereto. In this embodiment additional outlets 29 are provided within the area surrounded by the circular array of inlet ports 22 or by a circular slot 22. The outlets 29 are connected by passageways with the intake 18 of the pump. The circular array of outlets 29 may be replaced by a circular slot or by a single central port 29' located on the vertical axis 16.

The relationship explained hereinabove of the rigidity of the bearing with the various parameters of operation is controlled by the following mathematical equations in which R = overweight of the sphere
$b$ = lateral acceleration of the instrument
P = displacing force produced by acceleration
$\Delta s$ = displacement of the center of the sphere
S = rigidity of the bearing in p/cm
$g$ = gravity acceleration.

The force K produced by the acceleration $b$ amounts to $$K = \frac{R}{g} \cdot b.$$

With a bearing force $P = S \cdot \Delta s$ the displacement amounts to $$\Delta s = \frac{R \cdot b}{S \cdot g} \tag{1}$$

It follows the equation $$gb = \frac{S \cdot \Delta s}{R} \cdot g \tag{2}$$

indicating the permissible maximum acceleration.

The equations (1) and (2) show that the overweight R has a great influence on the stability of the bearing in event of accelerations. As fluctuations of the overweight of the floating sphere are unavoidable under practical conditions of operation, the overweight should be preferably chosen between 0.3 and 1.0 percent of the weight of the floating sphere 10.

A modification in accordance with the present invention of the gyroscopic compass illustrated in FIG. 13 of the above-mentioned prior U.S. Pat. No. 3,373,617 and described therein is illustrated in FIG. 6, the reference numerals being those used in the prior patent. This gyroscopic compass comprises the hollow sphere 110, motor-driven gyroscopes such as 112 mounted within the sphere so as to impart north-seeking properties thereto, the vessel 119 surrounding the sphere 110 and being provided with an inlet 129 at its bottom and with an outlet 135 at its top, a gap 114 being provided between the outer surface 102 of the sphere 110 and the inner surface 104 of the vessel 119, a container 121 surrounding the vessel 119 at spaced relationship thereto and rigidly connected therewith, the space 106 therebetween constituting a passageway leading from the outlet 135 to the inlet 129, a liquid having a level 108 substantially filling the container 121 and the vessel 119, a motor-driven pump 123 mounted in the container 121 at the bottom thereof below the inlet 129 for circulating the liquid through the inlet 129, the gap 104, the outlet 135 and the passageway 106, current-supplying means including conductive electrode portions 116, 117 and 118 of the surface 104 and opposed electrode portions (not shown) on the sphere 110 for supplying electrical energy to the gyroscopes 112 through the liquid in the gap 114, a housing 152, a rotary bracket 154 mounted in the housing 152 for rotation about a vertical axis 122, means including a gimbal ring 156 for suspending the container 121 by the bracket 154 within the housing 152 for universal movement about the center 158 of the vessel 119 in which the vertical axis 122 intersects the two principal horizontal axes 160 of the gimbal ring 156, a motor-driven fan 162 in the housing 152 for cooling the outside of the container 121 provided with outer cooling ribs 164, a follow-up motor 166 geared to the bracket 154 and electrical means diagrammatically indicated at 168 which are controlled by the current-supplying means and control the follow-up motor 166 so as to cause the container 121 and the vessel 119 to follow angular movements of the sphere 110 about its vertical axis 122. The electrical means 168 are well known in the art being disclosed by the U.S. Pat. No. 1,589,039 to Anschutz-Kaempfe and, therefore, need not be described in detail.

The housing 152 has an air inlet opening 170 and air outlet slots 171. The rotary impeller 136 of the pump is formed by the rotary armature of the squirrel-cage type of an A.C. motor the stator of which is inserted in an internal pocket provided in the bottom of the container 121. This stator is provided with radial slots constituting passageways for the liquid leading from the passageway 106 to the bottom of the impeller 136 and from the top of the impeller to the inlet 129.

The transmission between the follow-up motor 166 and the rotary bracket 154 comprises a stub shaft 172 flexibly mounted on the rotor of the follow-up motor 166 and frictionally engaging the periphery of a friction wheel 172a rotatably mounted on a shaft journaled in bearings connected to a horizontal plate 174 of the housing 170. A smaller friction wheel fixed to this shaft frictionally engages the periphery of a wheel 173 mounted on the horizontal plate 174 of the housing 152, a friction wheel 175 of smaller diameter integrally connected with the wheel 173 and a peripheral flange 176 fixed to the bracket 154 and frictionally engaged by the friction wheel 175. The bracket 154 carries the compass dial 177 disposed below a transparent window pane 178 carried by the housing 170. The lubber line is provided on a member 178 fixed to the housing 170. A second dial is provided on a conical skirt 179 fixed to the bracket 154 and cooperating with a lubber line indicator 180 fixed to the housing and visible through a window 181 in the side-wall of the housing 170. At the bottom of the inner pocket accommodating the pump 123 there is provided a bimetal thermostat 182 which controls the motor driving the fan 162 so as to keep the temperature in the surroundings of the thermostat constant.

The vessel 119 is composed of a lower cap, of an upper cap and of a cylindrical annular member therebetween which is provided with the electrode surface portion 117. Each of these elements may be formed by a suitable plastic. The lower cap may be formed with a metal core as illustrated in FIG. 6. The inner surface of revolution of the vessel 119 is so shaped that the width of the bearing portion of the gap decreases steadily from the inlet 129 to the exit 130 and is much wider between the exit 130 and the outlet 135, as described hereinabove with reference to FIGS. 1–4.

The embodiments of the invention described hereinabove with reference to the drawings are capable of many modifications within the scope of the appended claims. It is possible for instance to mount the vessel upside down with the inlet at the top and with the outlet at the bottom, provided that the overweight is negative or, in other words, provided that the weight of the floating sphere is lower than the weight of the liquid displaced by the floating sphere thus giving the sphere an uplift which is counteracted by the pressurized liquid acting on the top of the floating sphere.

The advantages of the invention as here outlined are best realized, however, when all of its features and instrumentalities are combined in one and the same structure, but useful devices may be produced embodying less than the whole. It will be obvious to those skilled in the art to which the invention appertains, that the same may be incorporated in several different constructions. The accompanying drawings, therefore, are submitted merely as showing the preferred exemplification of the invention.

What we claim is:

1. In a gyroscopic instrument, the combination comprising a hollow sphere, at least one motor-driven gyroscope mounted within said sphere, a vessel having an inlet and an outlet and an internal surface of revolution surrounding said sphere at a distance therefrom providing for a gap between the outer surface of said sphere and the inner surface of said vessel, a liquid filling said vessel, guide means on said vessel outside of said gap constituting a passageway leading from said outlet to said inlet, a motor-driven pump included in said passageway for circulating the liquid through said gap and through said passageway, and electrical current-supplying means including conductive electrode portions of said surfaces for supplying electrical energy to said gyroscope through the liquid in said gap, said inlet being located at a lower level than said outlet, said gap having a relatively narrow bearing zone communicating with said inlet and a relatively wider zone communicating with said outlet, said bearing zone having an exit merging said bearing zone with said wider zone, the liquid in said bearing zone portion of said gap forming a bearing supporting said sphere in floating condition spaced from the inner surface of said vessel against vertical and horizontal forces exerted on said sphere by gravity and acceleration, the width $s$ of said bearing zone of said gap amounting at any point between said inlet and said exit during the circulation of said liquid in the operative condition of said instrument to $$K \frac{d_o}{d} \cdot s_o$$

$s_o$ being the width of said gap at the level of said inlet, $d_o$ being the outer horizontal diameter of said sphere at the level of said inlet, $d$ being the outer horizontal diameter of said sphere at said point, and K being a constant amounting to from 0.9 to 1.3, $s$ being a steady function of $d$ between said inlet and said exit, the feeding capacity of said pump being such that the flow of the liquid through said gap from said inlet to said outlet is laminar, whereby displacement of the center of said sphere from the axis of said internal surface of revolution causes a high lateral force to be produced by the bearing pressure exerted by said liquid on said sphere in said bearing zone to thereby counteract said displacement.

2. The combination claimed in claim 1 in which the width $s$ of said bearing portion of said gap amounts to 0.013 – 0.0075 of the diameter of said sphere but at least to 0.5 mm.

3. The combination claimed in claim 1 in which said inlet of said vessel is formed by a circular array of inlet ports, the circle coinciding with the centers of said ports being normally horizontal and having a centriangle of 25° with respect to the center of the sphere.

4. The combination claimed in claim 1 in which the weight of said sphere and of the elements mounted therein amounts to 1.003 – 1.010 % of the weight of said liquid displaced by said sphere.

5. The combination claimed in claim 1 further comprising sensing means mounted on said vessel and responsive to the relative elevation thereto of said sphere floating in said vessel, controlling means for controlling said flow of the liquid through said gap, and means adjustable by said sensing means and acting on said controlling means for keeping said elevation constant.

6. The combination claimed in claim 1 in which said inner surface of said vessel is so shaped as to be tangent to a spherical surface having the same diameter as said sphere the line of tangency being a horizontal circle located within said bearing zone of said gap and below the center of said hollow sphere.

7. In a gyroscopic instrument, the combination comprising a hollow sphere, at least one motor-driven gyroscope mounted within said sphere, a vessel having an inlet and an outlet and surrounding said sphere at a distance therefrom providing for a gap between the outer surface of said sphere and the inner surface of said vessel, a liquid filling said vessel, guide means on said vessel outside of said gap constituting a passageway leading from said outlet to said inlet, a motor-driven pump included in said passageway for circulating the liquid through said gap and through said passageway, and electrical current-supplying means including conductive electrode portions of said surfaces for supplying electrical energy to said gyroscope through the liquid in said gap, said inlet being located at a level different from that of said outlet, said gaps forming a relatively narrow bearing zone communicating with said inlet and a relatively wider zone communicating with said outlet, said bearing zone having an exit merging said bearing zone with said wider zone, the liquid in said bearing zone of said gap forming a bearing supporting said sphere in floating condition spaced from the inner surface of said vessel against vertical and horizontal forces exerted on said sphere by gravity and acceleration, the width $s$ of said bearing portion of said gap amounting at any point of said bearing zone during the circulation of said liquid in the operative condition of said instrument to $$K \frac{d_o}{d} \cdot s_o$$

$s_o$ being the width of said gap at the level of said inlet, $d_o$ being the outer horizontal diameter of said sphere at the level of said inlet, $d$ being the outer horizontal diameter of said sphere at said point, and K being a constant amounting to from 0.9 to 1.3, $s$ being a steady function of $d$ between said inlet and said exit, the feeding capacity of said pump being such that the flow of the liquid through said gap from said inlet to said outlet is laminar.

* * * * *